United States Patent [19]
Eckert

[11] Patent Number: 5,462,580
[45] Date of Patent: Oct. 31, 1995

[54] METHOD FOR MOLTEN METAL TREATMENT

[76] Inventor: C. Edward Eckert, 260 Lynn Ann Dr., New Kensington, Pa. 15068

[21] Appl. No.: 316,790

[22] Filed: Oct. 3, 1994

Related U.S. Application Data

[63] Continuation-in-part of Ser. No. 91,608, Jul. 13, 1993, Pat. No. 5,364,450.

[51] Int. Cl.$^6$ .............................. C22B 9/05; C22B 21/06
[52] U.S. Cl. ................. 75/678; 75/680; 75/684; 75/708
[58] Field of Search ................... 75/678, 680, 681, 75/684, 685, 708

[56] References Cited

U.S. PATENT DOCUMENTS

| | | | |
|---|---|---|---|
| 3,982,913 | 9/1976 | Feichtinger | 75/708 |
| 4,784,374 | 11/1988 | Pelton | 266/235 |
| 5,160,693 | 11/1992 | Eckert et al. | 266/235 |
| 5,364,450 | 11/1994 | Eckert | 75/678 |

FOREIGN PATENT DOCUMENTS

| | | | |
|---|---|---|---|
| 247141 | 6/1964 | U.S.S.R. | 75/708 |

Primary Examiner—Melvyn Andrews
Attorney, Agent, or Firm—Andrew Alexander

[57] ABSTRACT

Disclosed is an improved method for dispersing a treatment media in a body of molten metal using an impeller, nozzles, and other mixing means to disperse the media in the body of molten metal, the method producing increased shear forces in the body of molten metal and preferably reducing vortex formation. In one embodiment, the method comprises the steps of providing a body of molten metal and an impeller on a shaft in the body. A treatment media is added to the body and dispersed by rotating said impeller in one direction and thereafter reversing the direction of rotation of the impeller to a counter direction. The direction of rotation of the impeller is reversed periodically to substantially reduce formation of a vortex around the shaft of the impeller and to provide increased shear forces in the body for purposes of improving treatment of the molten metal by improved dispersion of the media therein. Further, the reversal of direction of the impeller increases the radial velocity gradient of the molten metal thereby increasing shear forces. This creates numerous subsurface streams which has the effect of dispersing small gas bubbles throughout the melt. This substantially improves dispersion of fluxing material throughout the melt.

21 Claims, 5 Drawing Sheets

METHOD FOR MOLTEN METAL TREATMENT

CROSS REFERENCE TO RELATED APPLICATIONS

This application is a continuation in part of U.S. Ser. No. 08/091,608, filed Jul. 13, 1993, now U.S. Pat. No. 5,364,450.

BACKGROUND OF THE INVENTION

This invention relates to molten metal such as molten aluminum, and more particularly, it relates to an improved method for dispersing treatment media such a fluxing gas or salts in molten metal.

In the prior methods of dispersing fluxing gas, for example, in a molten aluminum body, the fluxing gas is introduced down a shaft into the body and dispersed by a rotating impeller mounted on the shaft. However, this method is not without problems. The rotating impeller creates a vortex about the shaft that indicates that a large portion of the molten metal is swirling or circulating about the impeller shaft at a rate approaching the rotation speed of the impeller. Fluxing media added to the molten metal tends to circulate with the molten metal with only minimal dispersion. Further, the vortex has the effect of increasing the surface area of the molten body exposed to air. The increased exposure of the molten metal to air results in an increase in dross formation, subsequent entrainment of the dross and its detrimental collateral effects. When the fluxing material is a gas, the vortex creates a problem in yet another way. Fluxing gas is displaced towards the center of the vortex by body force separation with the result that other parts of the molten body are not adequately treated with fluxing gas. Thus, the effectiveness of the process is reduced because portions of the molten body do not get treated with fluxing material. In addition, fluxing gas entrained in the molten metal flow pattern tends to coalesce, resulting in larger bubbles of fluxing gas developing in the melt. The larger bubbles lower the effectiveness of the fluxing process because less molten metal gets treated.

Common methods employed to suppress vortex formation include the insertion of baffles or rods into the melt. However, baffles are undesirable because a dead volume develops behind the trailing edges of the baffle. Another method used to suppress vortex formation is to limit power input to the impeller. However, this severely limits efficiency.

These problems continue to plague the industry as indicated in U.S. Pat. No. 5,160,693, for example, which discloses that with rotating impellers a surface vortex forms, the vortex rotating about and flowing downwardly along the impeller shaft, thereby agitating surface dross and drawing impurities back into the melt. The patent also indicates that an ideal system would minimize disturbances to the surface dross to prevent recontamination of the treated melt.

Thus, there is a great need for a more effective fluxing process which suppresses ingestion of dross from the surface back into the melt by vortex formation, for example, maintains the fluxing material finely dispersed throughout the molten body, and intensifies the contact of molten metal with fluxing material for improved fluxing of the melt.

SUMMARY OF THE INVENTION

An object of this invention is to provide an improved treatment process for dispersing media in molten metal.

Another object of this invention is to provide an improved fluxing process for molten aluminum.

Yet a further object of the invention is to provide an improved fluxing process for molten aluminum using a rotating impeller wherein substantially no vortex is formed.

And yet a further object of the invention is to provide an improved process for a body of molten aluminum wherein the fluxing gas is finely dispersed throughout the body for improved contact of fluxing gas with metal.

Still, yet another object of the invention is to provide a process for providing increased shear forces in a body of molten metal for improved dispersion of treatment media, such as fluxing gases and salts, throughout the body.

These and other objects will become apparent from a reading of the specification and claims and an inspection of the accompanying drawings appended hereto.

In accordance with these objects, there is provided an improved method for dispersing a treatment media in a body of molten metal using an impeller, nozzles, and other mixing means to disperse the media in the body of molten metal, the method producing increased shear forces in the body of molten metal and preferably reducing vortex formation. In one embodiment, the method comprises the steps of providing a body of molten metal and an impeller on a shaft in the body. A treatment media is added to the body and dispersed by rotating said impeller in one direction and thereafter reversing the direction of rotation of the impeller to a counter direction. The direction of rotation of the impeller is reversed periodically to substantially reduce formation of a vortex around the shaft of the impeller and to provide increased shear forces in the body for purposes of improving treatment of the molten metal by improved dispersion of the media therein. Further, the reversal of direction of the impeller increases the radial velocity gradient of the molten metal thereby increasing shear forces. This creates numerous subsurface streams which has the effect of dispersing small gas bubbles throughout the melt. This substantially improves dispersion of fluxing material throughout the melt.

DETAILED DESCRIPTION OF THE PREFERRED EMBODIMENTS

Figure 1:
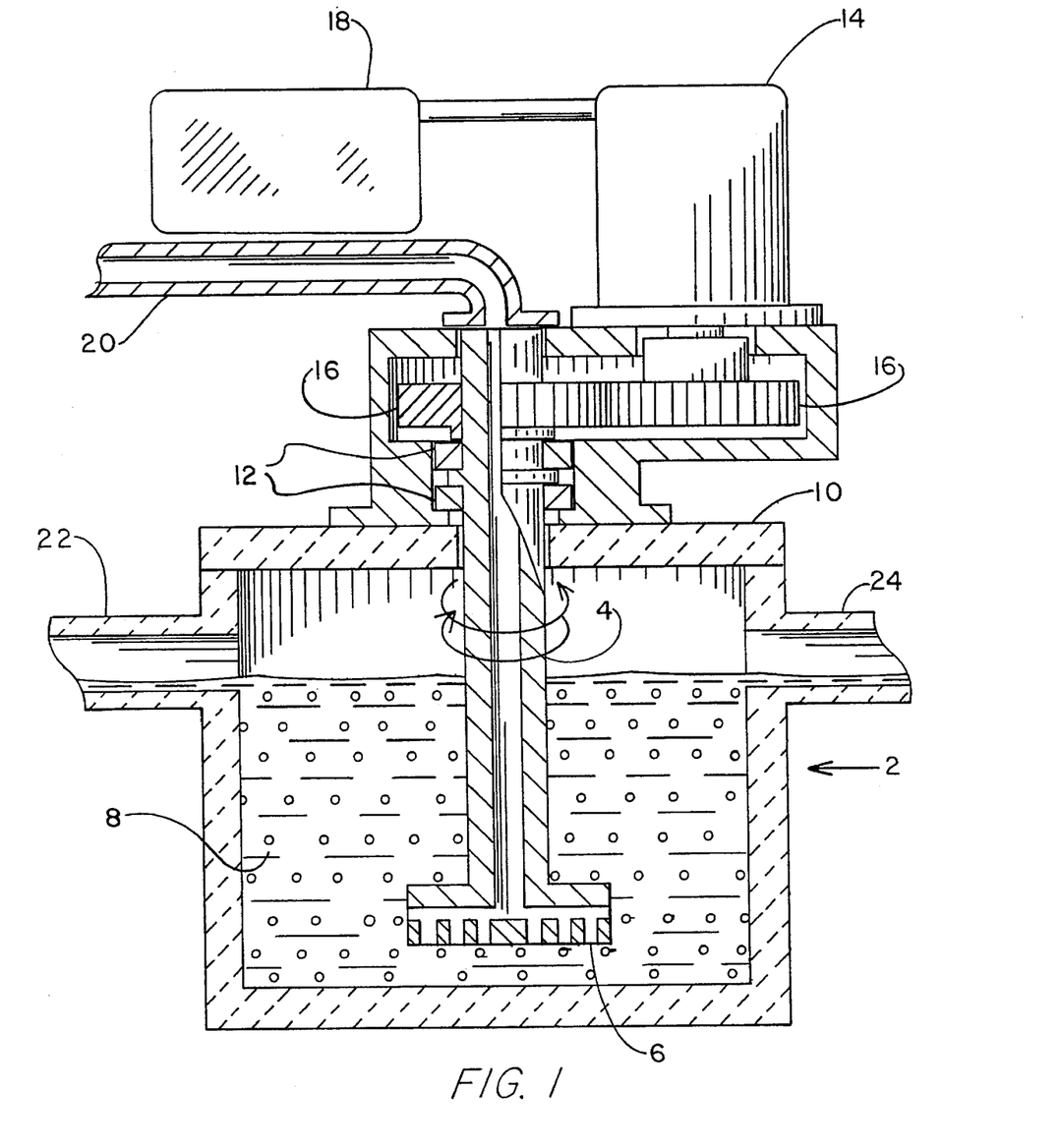
FIG. 1 is an elevational view in cross section illustrating the lack of vortex formation, molten metal flow characteristics and fluxing gas dispersion in the present invention utilizing a single impeller.

Referring more specifically to FIG. 1, there is shown a schematic of a gas fluxing bay 2 having a hollow shaft 4 and impeller 6 located in body of molten metal, e.g. aluminum, 8. Shaft 4 is carried by structure 10 and rotates on bearing 12. Further, shaft 4 is rotated by motor 14 through gears 16. Direction of rotation and revolution speed of motor 14 is controlled by control panel 18. Fluxing gas is added through tube 20 and down hollow shaft 4 before being dispersed through tubes or conduits in impeller 6 into molten aluminum 8. Instead of passing fluxing gas down hollow shaft 4, the fluxing gas may be added to the molten metal through a tube or other means. The fluxing gas may be injected adjacent impeller 6 for dispersing throughout the melt. Fluxing gases that can be used for molten aluminum in the present invention include nitrogen containing gases, carbon containing gases, e.g. fluorocarbons, halogen gases and the so-called inert gases; namely, helium, neon, argon, krypton, xenon, along with nitrogen, carbon dioxide and mixtures of these gases. In addition, chlorinaceous gases such as chlorine may be used individually or combined with the above gases. Gas fluxing can be performed in batch or on a continuous basis. On a continuous basis, molten metal enters along conduit 22 and leaves by channel 24 after fluxing has taken place.

The fluxing process removes both dissolved and suspended impurities, including oxides, nitrides, carbides, and carbonates of the molten metal and alloying elements. The dissolved impurities include both dissolved gases and dissolved solids. Dissolved gases in molten aluminum, for example, include hydrogen and dissolved solid particles include alkali elements such as sodium and calcium. When chlorine gas is added, for example, it forms the chloride salt of the impurity which rises to the surface and is removed. Suspended solids are transported to the melt surface by attachment to rising gas bubbles. Hydrogen is removed by desorption into the gas bubbles and is removed. Thus, it is important to keep a fine dispersion of fluxing gas or fluxing salt distributed throughout the melt in order to provide many sites for collection and removal of both dissolved and suspended impurities.

For purposes of fluxing in accordance with the present invention, shaft 4 and impeller 6 are rotated in either clockwise or counter-clockwise direction followed by reversing direction of rotation periodically. This has the effect of substantially eliminating formation of a vortex in the body of molten metal and the problems attendant therewith. Minimizing or eliminating the vortex greatly reduces the ingestion of dross from the surface into the body of melt being treated. More importantly, periodically reversing direction of rotation of impeller 6 has the effect of considerably increasing shear force developed in the molten metal, resulting in a more uniform, fine dispersion of fluxing material throughout fluxing bay. Adding fluxing material and reversing impeller rotation direction periodically increases fluid velocity gradients in the molten metal, particularly in the radial direction. It will be appreciated that adding fluxing gas and reversing direction of rotation of impeller 6 periodically has the effect of increasing the energy of mixing applied to the body of molten metal. However, the large increase in energy of mixing is obtained with substantially no vortex and the attendant problems of dross ingestion. For example, in prior gas fluxing methods, the impeller was rotated unidirectionally and the body of molten metal would be accelerated in the direction of rotation of the impeller resulting in formation of a vortex, and only minimal energy of mixing was applied during dispersing of fluxing gas. Further, metal in the body can be used as a reaction force, opposing the rotation of the impeller, thereby maximizing the energy input. As the body is accelerated in the direction of impeller rotation, the magnitude of the reaction force is proportional to difference in relative velocity between molten metal and impeller. In the present invention, reversing direction of rotation of impeller 6 periodically greatly intensifies the energy of mixing applied during dispersing of fluxing gas. This results in molten metal flow direction being directionless or random in the body of molten aluminum and without formation of a vortex.

By shear forces are meant the forces generated by a stream of molten metal in a body moving in one direction on a stream or portion of molten metal moving in another direction, for example, an opposite direction. For instance, when an impeller is rotated, the melt flows in the same direction as the impeller at a speed less than the speed of rotation of the impeller. However, both speeds are usually not very different. The greater the difference in these two speeds the greater is the capability for dividing fluxing gas into fine bubbles by the shear force. When the direction of rotation of the impeller is reversed, a stream of metal works on or creates a shear force on an adjacent stream or portion of molten metal until the whole body reverses direction. That is, the body is moving or rotating in one direction and when the impeller is reversed, a small portion of molten metal rotates in an opposite direction, the portion increases until the whole body rotates in a generally opposite direction. It is this period of reversing or changing direction of the molten metal which induces the greatest shear forces on adjacent portion or streams of molten metal to change directions.

By inducing movement of portions of the molten metal in different directions is meant that while first portions or streams of the molten metal are moving in one direction, for example, in a circular direction, other portions or streams are forced to move in another direction, for example, generally counter to the first portions or streams. The inducing of movement may also be performed by mixing means such as impellers, electromagnetic pumps, gas nozzles or tuyeres, and streams of molten metal introduced or applied to a body of the molten metal or a combination these mixing means. Further, moving portions of the molten metal in another direction by changing directions of applying the mixing means, for example, means that the direction of the impeller may be reversed or merely stopped periodically so as to induce shear stresses into the body of molten metal by having streams or portions of the molten metal going in one direction and then having streams or portions going in other directions. Another mixing means may be applied in another direction simultaneously or alternating with the first mixing means. For example, an impeller may be used to induce movement of a portion of the molten metal in one direction and an electromagnetic pump may be used to induce movement of a second portion in another direction to provide shear forces in the body.

By fluid velocity gradient is meant the velocity profile described by the quotient of the change in radial fluid velocity, $d_{V_r}$, and change in radial distance, $dr$. The velocity gradient is therefore, $d_{V_r}/dr$, by Newton's law of viscosity, the magnitude of the shear force, $\tau$, is related to the velocity gradient by the flow viscosity, $\eta$, as follows:

$$\tau = -\eta d_{V_r}/dr$$

With respect to the length of time before reversing the direction of rotation, this can extend to 10 minutes or more with a typical time period before reversing being less than 5 minutes with a suitable period being in the range of 0.1 seconds to 3 minutes. Or, the period for reversing can vary. For example, the reversing period may start at 5 minutes and then work down to 1 minute.

Figure 2:
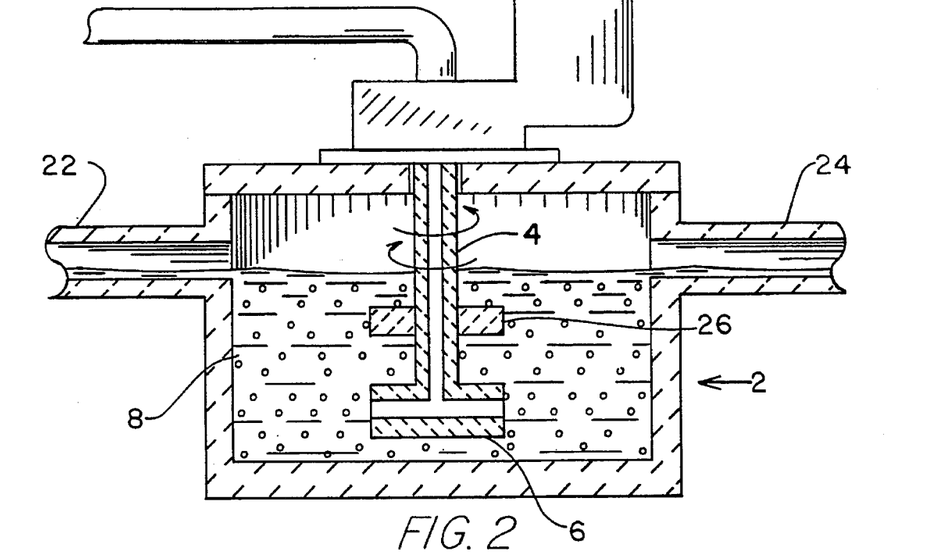
FIG. 2 is an elevational view in cross-section illustrating the invention using a double impeller.

FIG. 2 illustrates another embodiment wherein a second impeller 26 is fixed to a single impeller shaft 4. Impeller 6, fixed to the free end of shaft 4, can have a gas diffuser or nozzle or the gas can be supplied adjacent impeller 6 at a remote site in vessel 2 preferably below impeller 6. Additionally, impeller 26 may have a gas diffuser and can have the same configuration as impeller 6 or a different configuration which will aid in creating increased shear forces in molten metal when rotated in conjunction with impeller 6. Impeller 26 has the advantage of providing additional shear forces in the molten metal body when the rotation of the impeller is reversed. Thus, fluxing material is dispersed throughout the molten body with a higher level of intensity for a more efficient fluxing process. The times used for reversing can be similar to that used for the single impeller.

Figure 3:
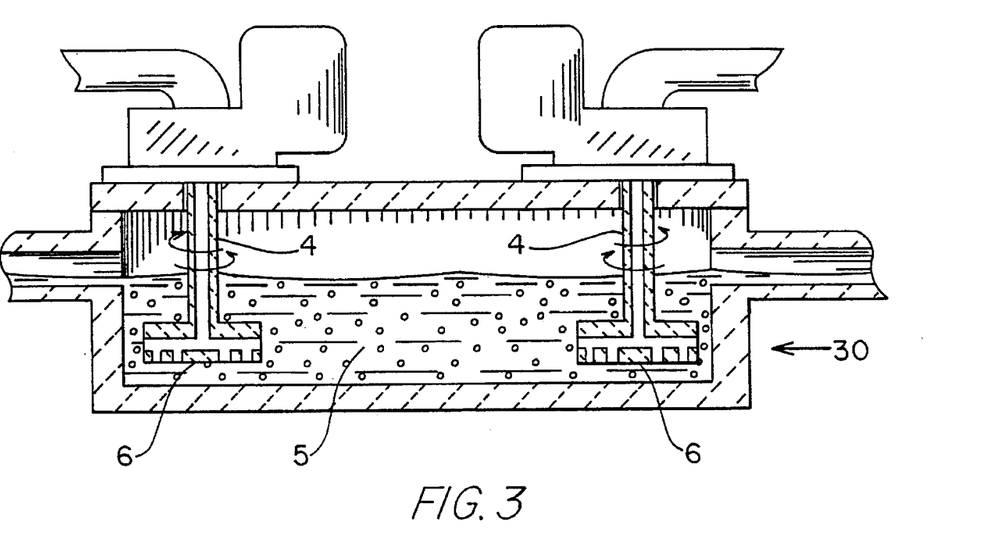
FIG. 3 is another cross-sectional view of twin impellers operating in accordance with the invention.

With reference to FIG. 3, there is shown another embodiment of the present invention including a containment vessel 30 having shafts 4 and impellers 6 containing molten aluminum 5. Shafts 4 and impellers 6 can be set to rotate in the same direction or opposite direction during the same time period. Thereafter, the rotation of each impeller is reversed periodically, usually in synchronization with the other impeller to provide for a high level of shear forces for dispersing of the media in the molten metal. Fluxing gas can be added in the same manner as referred to for the single impeller in FIG. 1. In this embodiment, the reversing cycle or period can be the same for each impeller or the reversing cycle can be shorter for one impeller and longer for the other and then these reversing cycles can be reversed in synchronization to obtain the most desirable combination of shear forces for dispersion. While two motors are shown driving the impellers in FIG. 3, one motor can be employed with the appropriate gears. The time periods for reversing direction of rotation can be similar to that described for FIG. 1.

Figure 4:
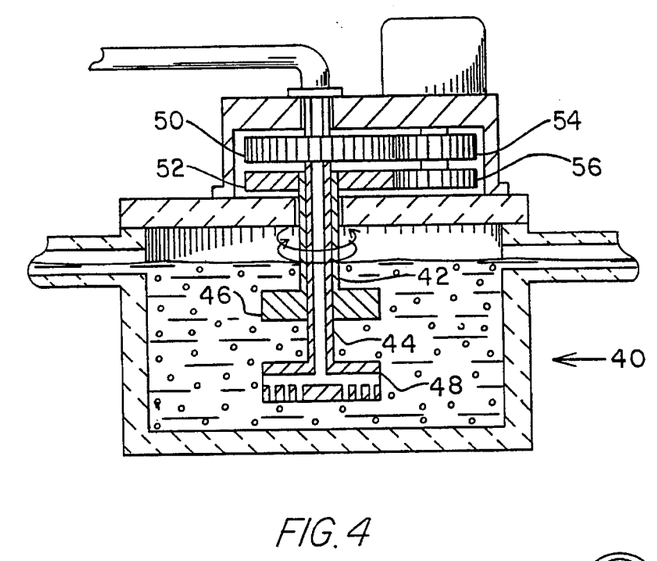
FIG. 4 shows a cross-sectional view of a further embodiment of the invention.

With respect to FIG. 4, there is shown a further embodiment of the present invention which includes a molten metal containment vessel 40 having two impellers on concentric shafts 42 and 44 which carry impellers 46 and 48. Fluxing gas may be supplied for fluxing purposes in the same way as referred to for FIG. 1. Additionally, for improved fluxing, the impellers 46 and 48 may rotate in the same direction for the same period of time. Further, impellers 46 and 48 may reverse direction at the same time for the same period. Or, impellers 46 and 48 may rotate in opposite directions for the same period, and both may reverse direction for the same period of time. Further, the rate of rotation for each impeller may be the same or one impeller may be set so as to rotate faster than the other in order to maximize shear force or the fluid velocity gradients in the molten metal. In the embodiment shown in FIG. 4, a single motor, which can be electric or air driven, is shown driving shafts 42 and 44 in the same direction of rotation through gears 50, 52, 54 and 56. In addition, the period or reversing cycle may be longer for one impeller than for the other impeller. Thus, it will be seen that various combinations of rates of rotation, direction of rotation, and periods of rotation may be utilized, all of which are intended to be encompassed within the scope of the invention because the specific details set forth are by way of illustration and not of limitation.

Figure 5:
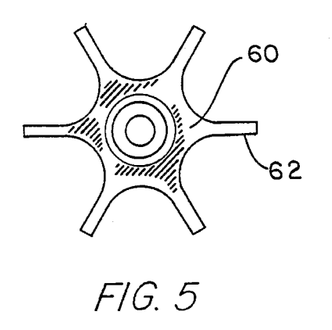
FIG. 5 is a top view of an impeller useful in the invention.
Figure 6:
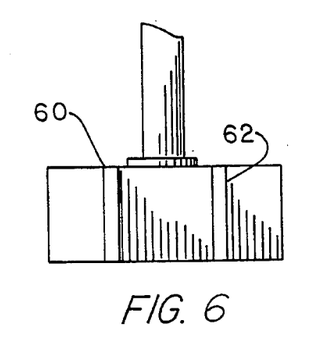
FIG. 6 is an elevational view of an impeller useful in the invention.
Figure 7:
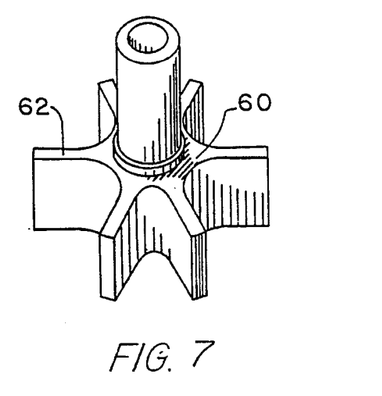
FIG. 7 is a perspective view of the impeller useful in the invention.

The impeller used in the present invention is any impeller which may be useful in creating shear forces in the melt for homogenization of the melt or for dispersing materials throughout the melt in accordance with the invention. Thus, the impeller may have canted vanes, and combinations of vanes may be used when two or more impellers are used. A suitable impeller 60, shown in FIGS. 5, 6 and 7, has vanes 62 substantially vertical to the plane of rotation. Such impeller is disclosed in U.S. Pat. No. 5,160,693 incorporated herein by reference.

The shaft and impeller may be made from graphite, silicon carbide or ceramic or such material which is compatible with molten metal such as molten aluminum.

The impellers of the present invention can rotate at an rpm in the range of 15 to 450 or combinations of such revolutions. The rate of rotation need not be constant. For example, the rate of rotation can be less at the beginning of the reversing period and can be higher at the end of the reversing period for purposes of inducing more constant shear stresses in to the melt.

Figure 8:
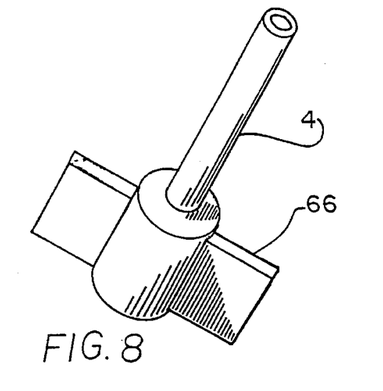
FIGS. 8 and 9 are embodiments illustrating impellers or paddles which may be used in accordance with the invention.
Figure 9:
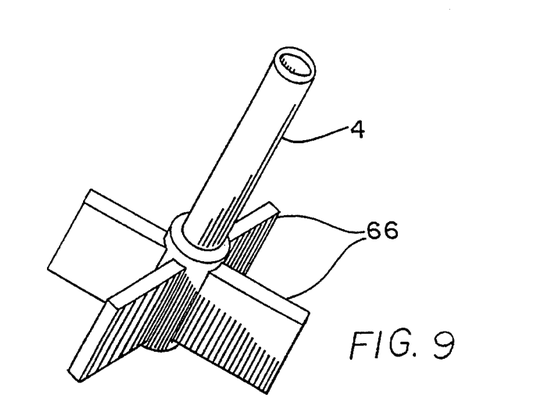

In addition, the impeller can have a flat paddle configuration as shown in FIG. 8 where shaft 4 terminates in flat plate 66. Fluxing gas may be added either remotely or through shaft 4 as disclosed earlier. Further, several flat plates 66 may be disposed along shaft 4 or shaft 4 may constitute a continuous plate at least to the extent that it is emerged in the melt. Plates 66 may be arranged as shown in FIG. 9, example, or any combination of plates may be used and such are intended to be encompassed within the scope of the invention. The plates or paddles generate very high shear forces in the melt in accordance with the invention and accordingly are very useful in the invention.

While generation of shear forces in melts such as molten metal having been demonstrated herein using impellers other mixing means or means for generating shear forces are contemplated. For example, shear forces may be generated by means of tuyeres 70, FIG. 10, in container 68 containing molten metal 5. In the configuration in FIG. 10, tuyeres 70 can be spaced apart up the side of container 68. One set of tuyeres 72 are arranged so as to direct gas or liquid such as molten salts therefrom in a clockwise direction and another set of tuyeres 74 can be positioned to direct gas or liquid therefrom in a counter current direction. One set of tuyeres are directed so as to move the melt in one direction and thereafter the second set of tuyeres are operated against the direction of the melt to generate shear forces therein to improve dispersion of fluxing material in the melt by reversing direction of melt flow.

In another embodiment the melt may be stirred in one direction by an electromagnet stirrer preferably in a circular direction. Afterwards, the electromagnet stirrer can be reversed periodically by reversing the electromagnetic field to generate shear forces in the melt and to promote intimate mixing or dispersing of media in the melt.

Figures 10, 11, 12:
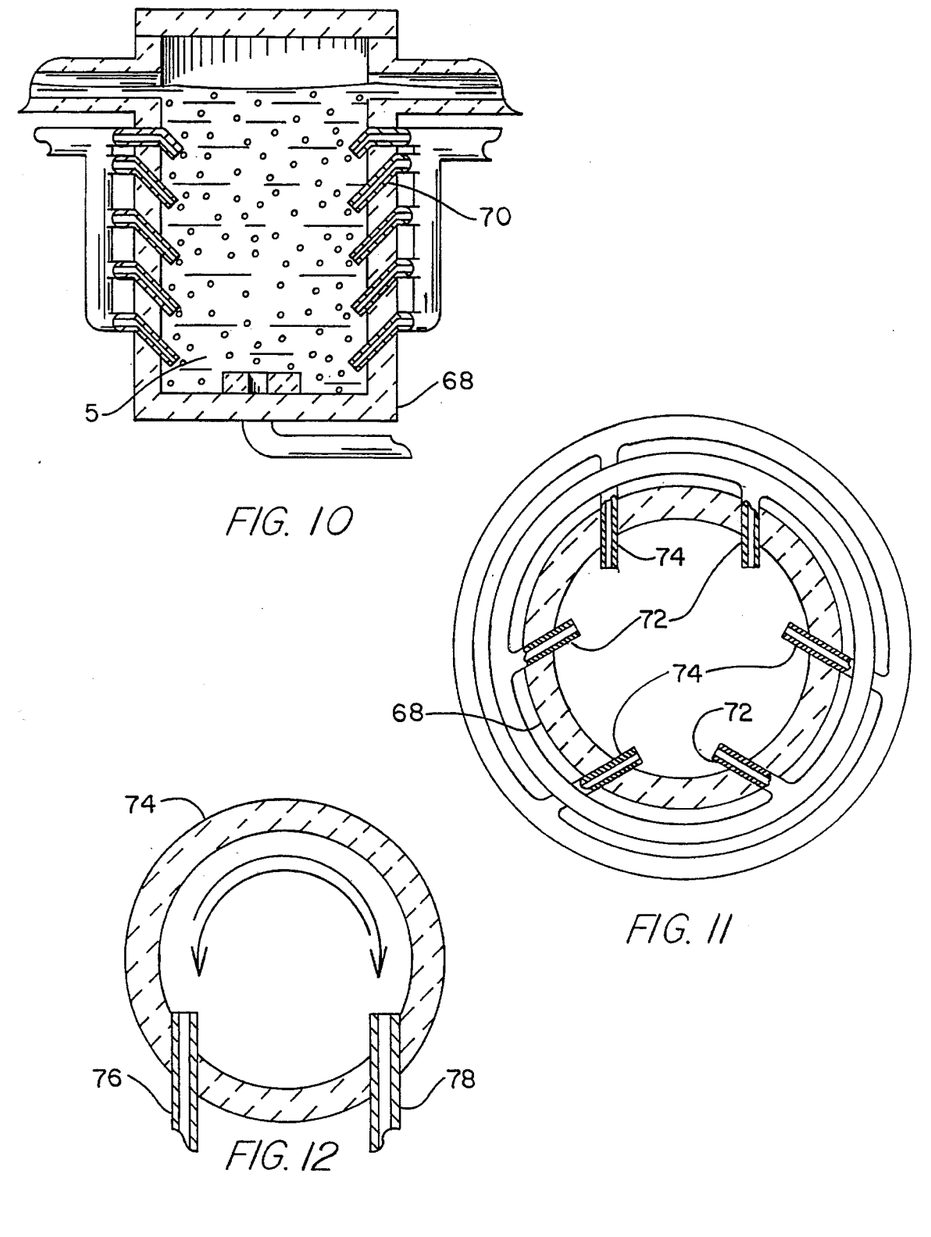
FIG. 10 is a cross section of a molten metal vessel employing tuyeres in the invention.
FIG. 11 is a cross section of the vessel of FIG. 10.
FIG. 12 is a top view of a molten metal vessel illustrating the use of molten metal conduits in the invention.

In FIG. 12, molten metal may be introduced to vessel 74 along conduit 76 to induce circular movement to the melt contained therein. Thereafter, the flow of molten metal along conduit 76 can be stopped and molten metal introduced through conduit 78 to generate shear forces in accordance with the invention. The flow of molten metal into vessel 74 can be alternated between conduits 76 and 78 to maintain a predetermined level of shear forces in the melt. It will be appreciated that combinations of these methods for generating shear forces are contemplated within the purview of the invention.

To facilitate fluxing efficiently, means is provided to interrupt gas flow to the body of molten metal at the time of rotation direction change of the impeller. This may be accomplished by use of a solenoid. In the preferred embodiment, and electric motor may be used to drove the impeller gearbox If a DC motor (direct current) is employed, the direction of rotation can be accomplished by reversing the direction of the applied current. Current reversal is facilitated by a set of timers to control the duration of rotation in either direction. This may be coupled to a double throw relay. An important element of the current reversing circuit is a means for ramping the applied current at a rate that does not mechanically shock the system immediately upon reversal. Also required is a mechanical device capable of bi-directional rotation that attaches the impeller to the drive shaft and the drive shaft to a gearbox.

Figure 13:
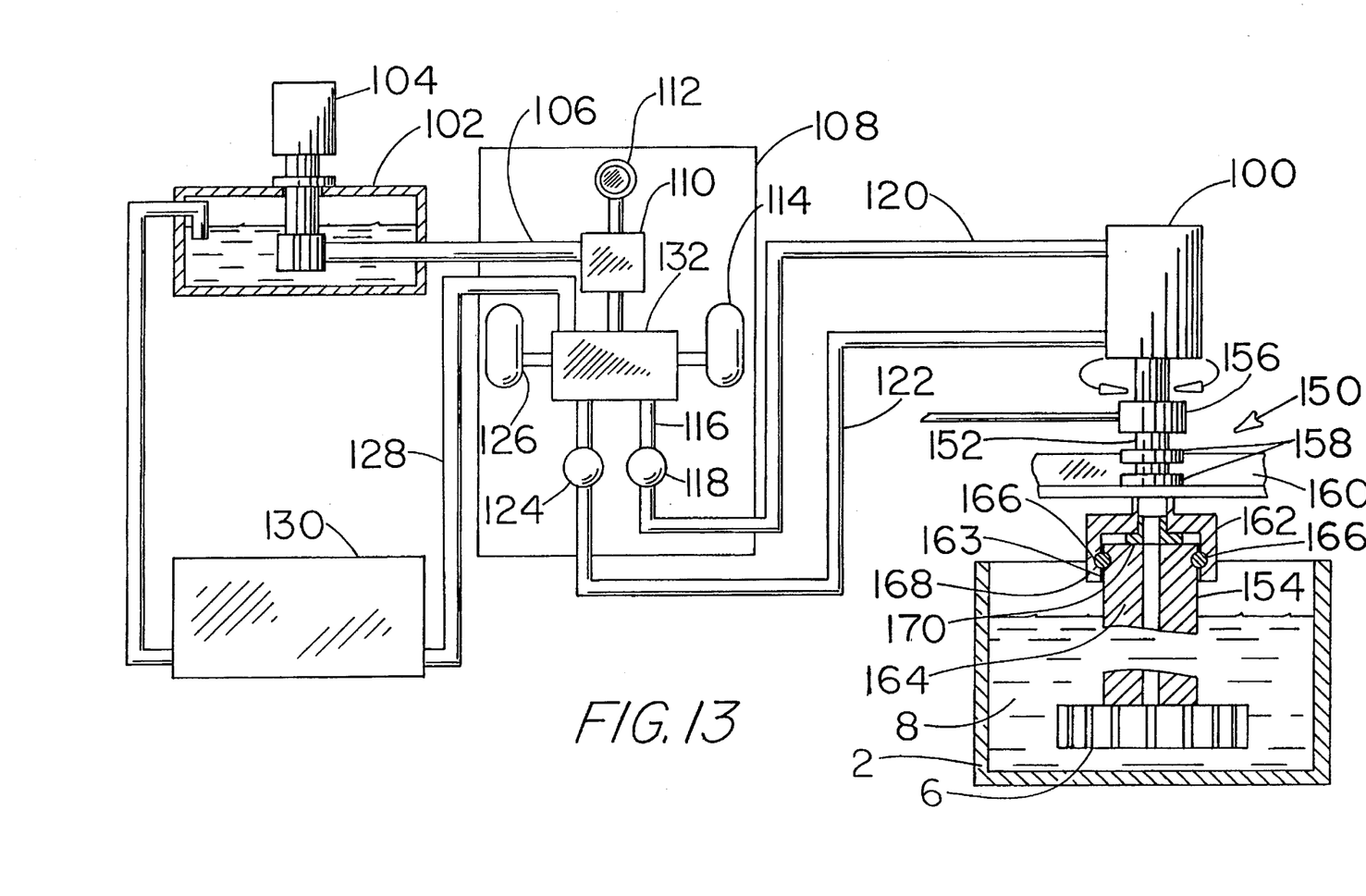
FIG. 13 is a schematic of a hydraulic drive system for a reversing impeller.

In another embodiment of the invention, a hydraulic motor may be employed to rotate the impeller or agitator in accordance with the invention. The schematic of fluid flow for driving hydraulic motor 100 is shown in FIG. 13 wherein a reservoir of hydraulic fluid 102 is provided having a variable displacement hydraulic pump 104 that flows fluid from reservoir 102 along line 106 to a hydraulic control panel 108. Fluid from line 106 enters a fluid flow meter 110 having an indicator 112. Indicator 112 is calibrated to provide a measurement of the rpm speed of hydraulic motor 100 since the flowrate of hydraulic fluid 102 is directly related to the speed of hydraulic motor 100. This eliminates the need for separate speed monitoring equipment installed on hydraulic motor 100. Speed regulation of hydraulic motor 100 is accomplished by manipulating the output of variable displacement hydraulic pump 104.

Hydraulic control panel 108 can include an accumulator 114 or, alternatively, a cushion valve, to dampen hydraulic fluid pressure pulses during starting or direction change of hydraulic motor 100. Accumulator 114 contains a bladder, precharged to a specific pressure with a gas, that momentarily compresses to adsorb hydraulic fluid pressure pulses.

The hydraulic fluid passes from accumulator 114 along line 116 to a velocity fuse 118 which is set at a predetermined value. A velocity fuse is a device that terminates hydraulic fluid flow through a hydraulic fluid line when the flowrate of said fluid through the line exceeds a predetermined maximum value. This value is typically 10–25% above the highest anticipated operational flowrate. Thus, if a line ruptures, only minimal hydraulic fluid escapes, and flow is automatically terminated until the system is shut down and reset. The fire danger associated with hydraulic fluid contacting molten metal is thus substantially eliminated.

After the velocity fuse, the hydraulic fluid passes along line 120 to hydraulic motor 100 and is returned along line 122 to second velocity fuse 124. A second accumulator 126 is provided for purpose of adsorbing hydraulic fluid pressure pulsed when the fluid flow direction is reversed.

After accumulator 126, the hydraulic fluid passes along line 128 through cooler 130 and back into reservoir 102.

Hydraulic control panel 108 also comprises a direction control valve 132 for reversing the direction of flow of hydraulic fluid along lines 120 and 122 and consequently reversing the direction of rotation of hydraulic motor 100. Directional control valve 132 can be set to reverse direction of rotation as noted herein. As noted, accumulators 114 and 126 can dampen the impact of reversal. Direction control valve 132 is a multi-port device that effectively allows either port of hydraulic motor 100 to be alternatively connected to the output of hydraulic pump 104, and the other port of motor 100 to be connected to reservoir 102.

In another feature of the invention, the direction of rotation of impeller can be controlled to apply high level of shear forces to body 8 containing molten metal. That is, the torque on impeller 6 can be sensed by measuring the pressure drop across hydraulic motor 100. Thus, direction of rotation can be set to change when the pressure drop across hydraulic pump 100 drops below a predetermined level. When the pressure drops, this indicates that a large portion of fluid 8 in vessel 2 is circulating or beginning to circulate in the direction of rotation of impeller 6, resulting in a drop in shear forces or mixing within body 8.

This system has the advantage that it eliminates the addition of heavy electrical motors, gear boxes and electrical connections to the drive assembly. Speed of rotation easily can be controlled between 50 to 800 rpm. Further, a hydraulic fluid can be used that has a low flash point such as a phosphate ester based hydraulic fluid.

In another aspect of the invention, there is provided an improved drive shaft assembly 150 which provides for connection of hydraulic motor drive shaft 152 to impeller 6 drive shaft 154. Referring further to FIG. 13, there is shown drive shaft assembly 150 having a rotary connector 156 for introducing fluxing gas which may be introduced to the melt through the hollow shaft assembly and distributed to the impeller. Shaft 152 which is driven by hydraulic motor 100 is mounted in bearings 158 in retainer plate 160 which may be a cover for container 2. Shaft 152 terminates in a cup-shaped retainer. Top end 164 of impeller shaft 154 is fitted into cup-shaped retainer 162 and held in position by pins 166. In the embodiment shown, pins 166 are placed or inserted in openings drilled through wall 168 of cup-shaped member 162. Pins 166 also are inserted through channels drilled in shaft 154 to retain shaft 152 in cup-shaped member 162. This retaining system provides for a simple, efficient way to securely fasten shaft 154 in retainer 162.

An important feature of connection between hydraulic motor shaft 152 and impeller shaft 154 is the materials for fabrication of cup 162. Thus, preferably retainer cup or coupler 162 is fabricated from a material having a thermal coefficient of expansion in the range of $2 \times 10^{-6}$ in/in/°F. to $8 \times 10^{-6}$ in/in/°F. Such material preferably is comprised of a metal alloy. Such alloys can be selected from KOVAR® OR INVAR® having compositions comprising iron, nickel and cobalt.

Other metals that may be selected for coupler 162 include titanium alloy, 1100, 6242 and CPTi.

Further, preferably retainer cup 162 is fabricated to have substantially parallel walls 163 to provide radial clearance between shaft 154 and walls 163 in the range of 0.002 to 0.015 inch. Thus, the dimension of coupler 162 is not substantially affected by change in temperature, and the connection remains securely fastened. High temperature O-rings 170 may be used to seal process gas within coupler 162 and shaft 154. Thus, coupler 162 provides for an effective connection between a shaft such as a graphite shaft without the use of threads or tapers which can disengage, particularly when direction of rotation is changed. Yet, the coupler provides a connector which facilitates impeller change.

While the novel hydraulic drive, shaft and impeller assembly have been shown for use where the drive direction is reversed periodically, its application is not limited thereto. That is, the novel hydraulic drive, shaft and impeller assembly can be used in uni-directional drive for molten metal mixing or molten metal fluxing systems, and such is contemplated within the purview of the invention.

The process in accordance with the invention has the advantage that it requires less processing time. Thus, there is considerable savings in the energy requirement to maintain the body of molten metal at temperature to perform the fluxing operation. Further, the process and system has the advantage that the equipment used for performing the fluxing can be downsized resulting in further savings. Because the subject system is more efficient in dispersing gas, considerably less gas is needed for the fluxing operation. In addition, because the present system is essentially vortex free when compared to conventional systems, less skim is generated and further only minimal skim is ingested into the melt. Thus, a protective layer of skim or salt or other material can be maintained on the surface of the body with substantially no ingestion. The system is generally more efficient in removing both dissolved and suspended impurities.

It should be understood that the shear forces and dispersion of media in the molten metal can be accomplished by a phase contactor or agitator provided in the body of molten metal. By phase contactor or agitator as used herein is meant to include a propeller, impeller, nozzles, rotating plates, counterflow of molten metal and the like. Also, it will be understood that the shear forces and dispersion may be created by a rotating molten metal container or insert whose direction of rotation is reversed periodically in accordance with the teachings of this invention.

While the invention has been described in terms of preferred embodiments, the claims appended hereto are intended to encompass other embodiments which fall within the spirit of the invention.

What is claimed is:

1. An improved method for dispersing a media in a body of molten metal using an impeller to disperse the media in the body of molten metal, the method producing increased shear forces in the body of molten metal and reducing vortex formation, the method comprising the steps of:
   (a) providing a body of molten metal;
   (b) projecting an impeller on a shaft in said body;
   (c) adding media to said body; and
   (d) dispersing said media by:
      (i) rotating said impeller in one direction; and thereafter
      (ii) reversing the direction of rotation of said impeller to a counter direction, said rotating accomplished by use of a hydraulic motor having a hydraulic motor shaft joined to said shaft of said impeller by a connection, said connection formed by said hydraulic motor shaft terminating in a cup-shaped member having said shaft of said impeller inserted into said cup-shaped member and locked therein, said cup-shaped member formed from a metallic material having a coefficient of expansion in the range of $2 \times 10^{-6}$ in/in/°F. to $8 \times 10^{-6}$ in/in/°F.;
      (iii) the direction of rotation of said impeller being reversed periodically to substantially reduce formation of a vortex around the shaft of said impeller and to provide increased shear forces in said body for purposes of improving treatment of said molten metal by improved dispersion of said media therein.

2. The method in accordance with claim 1 wherein the media is a fluxing gas.

3. The method in accordance with claim 1 wherein the media is a salt.

4. The method in accordance with claim 1 wherein the media is a fluxing gas introduced through said shaft and said impeller.

5. The method in accordance with claim 1 wherein the media is a gas introduced to said body adjacent said impeller.

6. The method in accordance with claim 1 wherein the molten metal is molten aluminum.

7. The method in accordance with claim 1 wherein the direction of rotation of said impeller is reversed at least every 10 minutes.

8. The method in accordance with claim 1 wherein the direction of rotation of said impeller is reversed at least every 3 minutes.

9. The method in accordance with claim 1 wherein the direction of rotation of said impeller is reversed in a time period in the range of 0.1 seconds to 4 minutes.

10. An improved method for dispersing a media in a body of molten aluminum using an impeller to disperse the media in the body of molten aluminum, the method producing increased shear forces in the body of molten aluminum and reducing vortex formation, the method comprising the steps of:
    (a) providing a body of molten aluminum;
    (b) projecting an impeller on a shaft in said body;
    (c) adding media to said body; and
    (d) dispersing said media by:
       (i) rotating said impeller in one direction; and thereafter
       (ii) reversing the direction of rotation of said impeller to a counter direction, said rotating accomplished by use of a hydraulic motor having a hydraulic motor shaft joined to said shaft of said impeller by a connection, said connection formed by said hydraulic motor shaft terminating in a cup-shaped member having said shaft of said impeller inserted and locked in said cup-shaped member, said cup-shaped member formed from a metallic material having a coefficient of expansion in the range of $2 \times 10^{-6}$ in/in/°F. to $8 \times 10^{-6}$ in/in/°F.;
       (iii) the direction of rotation of said impeller being reversed periodically to substantially reduce formation of a vortex around the shaft of said impeller and to provide increased shear forces in said body for purposes of improving treatment of said molten aluminum by improved dispersion of said media therein.

11. An improved method for dispersing a fluxing gas in a body of molten aluminum using an impeller to disperse the fluxing gas in the body of molten aluminum, the method producing increased shear forces in the body of molten aluminum and reducing vortex formation, the method comprising the steps of:
    (a) providing a body of molten aluminum;
    (b) projecting an impeller on a shaft in said body;
    (c) adding fluxing gas to said body by one of passing said fluxing gas through said shaft and adding said fluxing gas adjacent said impeller; and
    (d) dispersing said fluxing gas by:
       (i) rotating said impeller in one direction; and thereafter
       (ii) reversing the direction of rotation of said impeller to a counter direction, said rotating accomplished by use of a hydraulic motor having a hydraulic motor shaft joined to said shaft of said impeller by a connection, said connection formed by said hydraulic motor shaft terminating in a cup-shaped member having said shaft of said impeller inserted and locked in said cup-shaped member, said cup-shaped member formed from a metallic material having a coefficient of expansion in the range of $2 \times 10^{-6}$ in/in/°F. to $8 \times 10^{-6}$ in/in/°F.;
       (iii) the direction of rotation of said impeller being reversed periodically to substantially reduce formation of a vortex around the shaft of said impeller and to provide increased shear forces in said body for purposes of improving fluxing of said molten aluminum by improved dispersion of said fluxing gas therein.

12. The method in accordance with claim 1 wherein said hydraulic motor is driven by flow of hydraulic fluid through a hydraulic fluid line wherein excess hydraulic fluid flowrate is controlled by a velocity fuse.

13. The method in accordance with claim 1 wherein said hydraulic motor has a hydraulic fluid drive line extending from and returning to a hydraulic fluid reservoir, said hydraulic fluid drive line having an accumulator to absorb hydraulic fluid pressure pulses on rotation direction changes.

14. The method in accordance with claim 1 wherein said hydraulic motor has hydraulic fluid drive lines extending from and returning to a hydraulic fluid reservoir, said hydraulic fluid drive line having a direction control valve for periodically reversing the direction of fluid in said lines.

15. The method in accordance with claim 1 including providing a hydraulic fluid inlet line to said hydraulic motor and a hydraulic fluid outlet line to said hydraulic motor, measuring the torque across said hydraulic motor and changing direction of rotation of said impeller by sensing torque level.

16. A method for producing increased shear forces in a body containing molten metal by movement of the molten metal within the body, the movement providing improved dispersion of a media within the body, the method comprising the steps of:
  (a) providing a body containing said molten metal;
  (b) projecting a mixing means into said body for applying movement to said body; and
  (c) creating said shear forces by:
    (i) rotating said mixing means in one direction; and thereafter
    (ii) reversing the direction of rotating said mixing means to a counter direction, said rotating accomplished by use of a hydraulic motor having a hydraulic motor shaft joined to said shaft of said impeller by a connection, said connection formed by said hydraulic motor shaft terminating in a cup-shaped member having said shaft of said impeller inserted into said cup-shaped member and locked therein, said cup-shaped member formed from a metallic material having a coefficient of expansion in the range of $2\times10^{-6}$ in/in/°F. to $8\times10^{-6}$ in/in/°F.;
    (iii) the direction of rotating said mixing means being reversed periodically to provide said increased shear forces in said body for purposes of improving dispersion of media within said molten metal.

17. A method for producing increased shear forces in a body containing molten metal by inducing movement of portions of the molten metal in different directions within the body, the movement providing improved dispersion of a media contained in the body, the method comprising the steps of:
  (a) providing a body containing said molten metal;
  (b) projecting a mixing means into said body for applying movement to said body; and
  (c) creating shear forces by:
    (i) moving portions of said molten metal in one direction by rotating said mixing means in one direction; and thereafter
    (ii) moving portions of said molten metal in another direction by changing the direction of rotating said mixing means, said rotating accomplished by use of a hydraulic motor having a hydraulic motor shaft joined to said shaft of said impeller by a connection, said connection formed by said hydraulic motor shaft terminating in a cup-shaped member having said shaft of said impeller inserted into said cup-shaped member and locked therein, said cup-shaped member formed from a metallic material having a coefficient of expansion in the range of $2\times10^{-6}$ in/in/°F. to $8\times10^{-6}$ in/in/°F.;
    (iii) the direction of applying said mixing means being changed periodically to provide said increased shear forces in said body for purposes of improving dispersion of said molten metal by improved dispersion of said media therein.

18. A method for producing increased shear forces in a body containing molten metal for improved dispersion of a media in the body using mixing means, the method comprising the steps of:
  (a) providing a body containing molten metal;
  (b) projecting a mixing means into said body; and
  (c) creating said shear forces by:
    (i) applying said mixing means in one direction; and thereafter
    (ii) reversing the direction of applying said mixing means to a counter direction, said rotating accomplished by use of a hydraulic motor having a hydraulic motor shaft joined to said shaft of said impeller by a connection, said connection formed by said hydraulic motor shaft terminating in a cup-shaped member having said shaft of said impeller inserted into said cup-shaped member and locked therein, said cup-shaped member formed from a metallic material having a coefficient of expansion in the range of $2\times10^{-6}$ in/in/°F. to $6\times10^{-6}$ in/in/°F.;
    (iii) the direction of applying said mixing means being reversed periodically to provide said increased shear forces in said body for purposes of improving dispersion of said molten metal by improved dispersion of said media therein.

19. An improved method for dispersing a media in a body of molten metal using an impeller to disperse the media in said body, the method comprising the steps of:
  (a) providing a body of molten metal;
  (b) providing an impeller on a shaft in said body;
  (c) adding media to said body; and
  (d) dispersing said media by:
    (i) rotating said impeller in one direction, said rotating accomplished by use of a hydraulic motor having a hydraulic motor shaft joined to said shaft of said impeller by a connection, said connection formed by said hydraulic motor shaft terminating in a cup-shaped member having said shaft of said impeller inserted into said cup-shaped member and locked therein, said cup-shaped member formed from a metallic material having a coefficient of expansion in the range of $2\times10^{-6}$ in/in/°F. to $6\times10^{-6}$ in/in/°F.

20. The method in accordance with claim 15 wherein the metal is molten aluminum.

21. The method in accordance with claim 15 wherein a radial clearance in the range of 0.002 to 0.015 inch is maintained between said cup-shaped member inside surface and said impeller shaft inserted thereinto.

* * * * *